Figure 1:
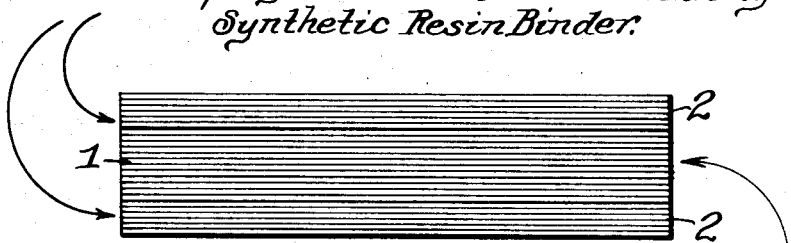

Fabric Impregnated with Predominantly Synthetic Resin Binder.

Core of Fabric Impregnated with Predominantly Blood Binder.

Consolidated Composet Laminated Panel.

Inventor:
Carl W. Krause,
By Dyrenforth, Lee, Chritton & Wiles,
Attys

Patented Oct. 12, 1937

2,095,706

UNITED STATES PATENT OFFICE 2,095,706

COMPOSITE LAMINATED PANEL

Carl W. Krause, Westchester, Ill., assignor to Wilson & Co., Inc., a corporation of Delaware Application October 17, 1935, Serial No. 45,481

5 Claims. (Cl. 154—45.9)

This invention relates to a composite laminated panel, and particularly to a panel having a core impregnated with a soluble blood binder and having a coating layer of resin impregnated material.

In the co-pending application of Adrian A. Robinson, Serial No. 45,501 filed Oct. 17, 1935, a laminated material comprising layers of fabric impregnated with blood or blood together with a resin is described. The present invention constitutes an improvement upon such a laminated material.

The invention is illustrated in the drawing, in which—

Figure 2:
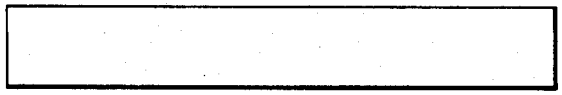

Fig. 1 is a vertical section of an unconsolidated panel comprising a core 1 of laminated material impregnated with blood and surface layers 2 of fabric impregnated with a synthetic resin; Fig. 2 is a corresponding section through the consolidated panel.

In accordance with this invention, fabric material such as paper, linen, cotton, muslin, or other animal, vegetable, or mineral material may be impregnated with a solution of blood, dried and pressed together under heat and pressure. It is preferred that the sheets contain from thirty to eighty percent blood and from seventy to twenty percent fabric. The sheets may be of any desired thickness, for example, from one to twenty thousandths inch and are combined in sufficient number to produce a core of the desired thickness. For example, twelve to fifteen sheets of alpha cellulose paper, having a thickness of approximately .0135 may be impregnated with sufficient soluble blood to produce a sheet containing fifty percent blood when dried. The sheets are then dried and when dry piled together and consolidated under a temperature of from 250° to 400° F., preferably 300° F. and under a pressure of not less than 500 pounds per square inch and preferably 1000 pounds per square inch.

Instead of impregnating the fabric with the soluble blood, the blood may be dried and incorporated as a molding powder.

Small amounts of a synthetic resin may be incorporated with the blood in the core, say ten to thirty percent, preferably not over fifteen percent, based on the blood.

In order to produce the finished composite laminated panel, outer surface layers are prepared of resin-impregnated fabric. The fabric here may be any suitable animal, vegetable, or mineral fabric, preferably a cellulosic fabric such as alpha cellulose, paper, linen, cotton, muslin, or the like. The fabric is impregnated with synthetic resin, such as a phenol-formaldehyde, urea-formaldehyde, phenol-furfural, or other synthetic resin, in the known manner. Sufficient layers of the fabric are taken to produce a thickness of from .002 to .0625 inch.

Normally only a single layer of fabric is used for the resin layer, but the number may be increased as desired.

The thickness of the resin impregnated material is independent of the thickness of the core. Thus the ratio of surface layer to core may be very high in the case of a thin panel, or very low in the case of a thick panel.

The resin-impregnated sheets are then dried, piled to the desired thickness and consolidated with the core. The laminated panel may be made by pressing all of the sheets, both blood-impregnated and resin-impregnated, at the same time, or the core may be consolidated first and the resin sheets pressed on subsequently.

The temperature used for pressing the resin is approximately 250° to 400° F., preferably approximately 300° F. and the pressure is not less than 500 pounds per square inch and preferably not less than 1000 pounds per square inch.

In preparing the resin sheets, the fabric, instead of being impregnated with a solution of the resin, may be coated with powdered synthetic resin as a molding powder. Small amounts of soluble blood, not more than ten percent of the resin, may be incorporated in the surface material, but it is preferred not to use any of the blood in this layer.

The composite panel prepared in the manner herein described has a materially lower water absorption than a similar panel prepared from fabric and blood or fabric impregnated with a combination of blood and resin, as described in the application of Adrian A. Robinson, hereinbefore referred to. At the same time, a surface finish is provided which is glossier than that obtained with blood. The natural odor of the blood is sealed in by the resin surface and the resin surface permits panels of varying colors to be produced, whereas with blood panels the range of color is very limited.

On the other hand, the blood-impregnated core is less brittle and tougher than resin panels and this characteristic is transmitted to the thin surface layer, so that the composite panel lends itself better to punching and shearing than resin panels.

No attempt is made to seal the edges of the panel, particularly inasmuch as the material is preferably prepared in large sheets from which punchings or shearings are made.

For most purposes it is preferred to cover the upper and lower sides of the core with the thin layer of synthetic resin-impregnated fabric. For some purposes, however, only one side need be so protected.

The percentage of resin binder in the surface layer will generally run from forty to seventy-five percent by weight of the fabric, sixty-five percent being a typical percentage.

By a blood binder as used in the claims is meant a binder predominantly of blood, and by resin binder is meant a binder substantially entirely of resin.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. A composite laminated panel comprising a consolidated core of fabric layers impregnated throughout with a blood binder and a surface layer consolidated under heat and pressure with the core of a fabric layer impregnated with a synthetic resin binder.

2. A composite laminated panel comprising a consolidated core of fabric layers impregnated throughout with a blood binder and a thin surface layer consolidated under heat and pressure with the core, of a fabric layer impregnated with a synthetic resin binder, said core being relatively thick with respect to the surface layer.

3. A panel as set forth in claim 1 in which the upper and lower surfaces of the core are both covered with a surface layer of resin-impregnated fabric.

4. A panel as set forth in claim 1 in which a core comprises twenty to seventy percent fabric and eighty to thirty percent blood binder.

5. A panel as set forth in claim 1 in which the core comprises a thirty to eighty percent blood binder and the surface layer comprises a forty to seventy-five percent resin binder.

CARL W. KRAUSE.